US012621743B2

(12) United States Patent
Fujishiro

(10) Patent No.: US 12,621,743 B2
(45) Date of Patent: May 5, 2026

(54) METHOD AND RELAY NODE

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 679 days.

(21) Appl. No.: 17/935,830

(22) Filed: Sep. 27, 2022

(65) Prior Publication Data

US 2023/0016871 A1     Jan. 19, 2023

Related U.S. Application Data

(63) Continuation of application No. PCT/JP2021/008638, filed on Mar. 5, 2021.

(30) Foreign Application Priority Data

Mar. 27, 2020     (JP) ................................. 2020-057444

(51) Int. Cl.
| | |
|---|---|
| *H04W 40/22* | (2009.01) |
| *H04B 7/155* | (2006.01) |
| *H04W 76/12* | (2018.01) |
| *H04W 84/04* | (2009.01) |

(52) U.S. Cl.
CPC ........ *H04W 40/22* (2013.01); *H04B 7/15542* (2013.01); *H04W 76/12* (2018.02); *H04W 84/047* (2013.01)

(58) Field of Classification Search
CPC ... H04W 40/22; H04W 76/12; H04W 84/047; H04W 16/32; H04W 72/542; H04W 24/10; H04B 7/15542
See application file for complete search history.

(56) References Cited

U.S. PATENT DOCUMENTS

| | | | |
|---|---|---|---|
| 12,490,126 B1 * | 12/2025 | Bahr | H04W 24/08 |
| 2017/0048912 A1 * | 2/2017 | Sharma | H04W 76/11 |
| 2020/0015147 A1 * | 1/2020 | Malkamaki | H04W 40/22 |
| 2020/0252847 A1 * | 8/2020 | Park | H04W 76/27 |
| 2020/0351705 A1 * | 11/2020 | Chae | H04L 5/0044 |
| 2020/0367131 A1 * | 11/2020 | Tang | H04W 40/22 |
| 2021/0007011 A1 * | 1/2021 | Zhu | H04B 7/15542 |
| 2021/0058847 A1 | 2/2021 | Liu | |

(Continued)

FOREIGN PATENT DOCUMENTS

WO     2019/128626 A1     7/2019

OTHER PUBLICATIONS

Ericsson, "QoS Mapping to Backhaul Bearers in IAB Networks", 3GPP TSG RAN WG3 Meeting #103bis, Apr. 8-12, 2019 (Year: 2019).*

(Continued)

*Primary Examiner* — Jeffrey M Rutkowski
(74) *Attorney, Agent, or Firm* — Studebaker Brackett PLLC

(57)     ABSTRACT

A method according to a first aspect is a method performed by a relay node that establishes a radio backhaul link, with an adjacent relay node, relaying communication between a user equipment and a donor base station. The method includes measuring a parameter related to communication quality of a data packet by a BAP entity that transmits or receives the data packet via the radio backhaul link, and reporting a result of the measuring to the donor base station by an upper entity locating in an upper layer than the BAP entity.

13 Claims, 9 Drawing Sheets

(56)                    References Cited

U.S. PATENT DOCUMENTS

| | | | | |
|---|---|---|---|---|
| 2021/0105795 | A1* | 4/2021 | Zhu | H04W 72/542 |
| 2021/0119920 | A1* | 4/2021 | Tesanovic | H04L 47/12 |
| 2021/0282050 | A1* | 9/2021 | Adjakple | H04L 1/1874 |
| 2022/0052956 | A1* | 2/2022 | Hu | H04B 17/364 |
| 2022/0182917 | A1* | 6/2022 | Muhammad | H04W 40/248 |
| 2022/0386187 | A1* | 12/2022 | Yuan | H04W 36/0061 |

OTHER PUBLICATIONS

3rd Generation Partnership Project; Technical Specification Group
Radio Access Network; Evolved Universal Terrestrial Radio Access
(E-UTRA); Layer 2—Measurements; 3GPP TS 36.314 V15.2.0;
Dec. 2018; pp. 1-28; Release 15; 3GPP Organizational Partners.
ZTE, Sanechips; "Consideration on Routing in IAB"; 3GPP TSG
RAN WG2 Meeting #108; R2-1915112; Nov. 18-22, 2019; pp. 1-4;
Reno, USA.

* cited by examiner

100

METHOD AND RELAY NODE

RELATED APPLICATIONS

The present application is a continuation based on PCT Application No. PCT/JP2021/008638, filed on Mar. 5, 2021, which claims the benefit of Japanese Patent Application No. 2020-057444 filed on Mar. 27, 2020. The content of which is incorporated by reference herein in their entirety.

TECHNICAL FIELD

The present disclosure relates to a method, a relay node, and a communication node used in a mobile communication system.

BACKGROUND ART

In the 3rd Generation Partnership Project (3GPP), which is a standardization project of a mobile communication system, a new relay node referred to as an Integrated Access and Backhaul (IAB) node has been under study. One or a plurality of relay nodes are located between a user equipment and a donor base station. The relay node establishes a radio backhaul link with another relay node or the donor base station to perform relay for communication between the user equipment and the donor base station via the radio backhaul link.

The 3GPP defines Minimization of Drive Test (MDT), which is a technique for optimizing a network configuration by using results of communication quality measurement performed in a base station or a user equipment. Examples of such communication quality measurement include packet loss measurement, packet delay measurement, and the like (see NPL 1, for example).

CITATION LIST

Non-Patent Literature

NPL 1: 3GPP Technical specification "TS36.314 V15.2.0" December 2018

SUMMARY OF INVENTION

A method according to a first aspect is a method performed by a relay node that establishes a radio backhaul link, with an adjacent relay node, relaying communication between a user equipment and a donor base station. The method includes measuring a parameter related to communication quality of a data packet by a Backhaul Adaptation Protocol (BAP) entity that transmits or receives the data packet via the radio backhaul link, and reporting a result of the measuring to the donor base station by an upper entity located in an upper layer than the BAP entity.

A method according to a second aspect is a method performed by a communication node. The method includes transmitting or receiving a data packet to a different communication node or from the different communication node by using a first radio resource belonging to a first cell group and a second radio resource belonging to a second cell group, and measuring a first parameter related to communication quality of a data packet transmitted or received using the first radio resource, and a second parameter related to communication quality of a data packet transmitted or received using the second radio resource.

A relay node according to a third aspect is a relay node that establishes a radio backhaul link with an adjacent relay node, relaying communication between a user equipment and a donor base station. The relay node includes a Backhaul Adaptation Protocol (BAP) entity that transmits or receives a data packet via the radio backhaul link, and an upper entity located in an upper layer than the BAP entity, in which the BAP entity performs measurement of a parameter related to communication quality of the data packet, and the upper entity reports a result of the measurement to the donor base station.

DESCRIPTION OF EMBODIMENTS

In a case where communication between a user equipment and a donor base station is relayed by one or a plurality of relay nodes, it is desired to implement the communication quality measurement performed in the relay node(s).

In view of this, the present disclosure has an object to appropriately measure communication quality for a radio backhaul link of a relay node.

Figure 1:
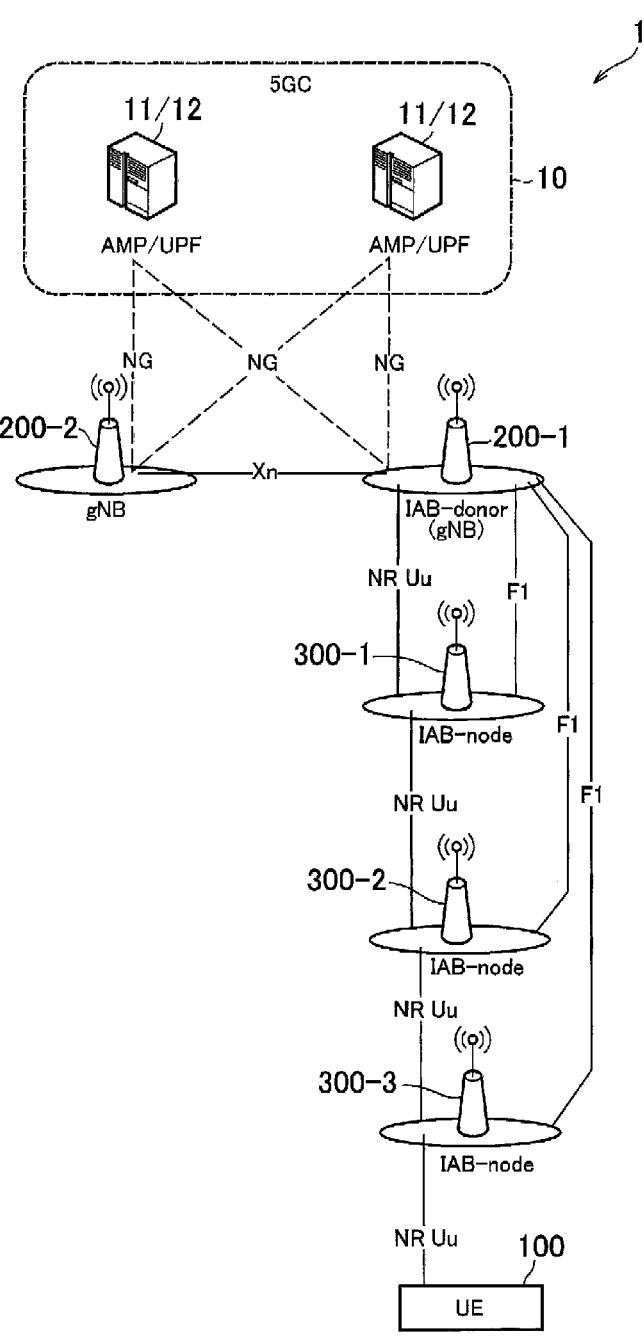
FIG. 1 is a diagram illustrating a configuration of a mobile communication system 1 according to an embodiment.

A mobile communication system according to an embodiment will be described with reference to the drawings. In the description of the drawings, the same or similar parts are denoted by the same or similar reference signs.
Configuration of Mobile Communication System First, a configuration of a mobile communication system according to an embodiment will be described. FIG. 1 is a diagram illustrating a configuration of a mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of the 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a relay node. An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node that manages one or a plurality of cells. The cell is used as a term denoting a minimum unit of a wireless communication area. The cell may be used as a term denoting a function or a resource for performing wireless communication with the UE 100. One cell belongs to one carrier frequency.

Each gNB 200 is connected to the 5GC 10 via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 being a terminal node of the NR backhaul in the network and including additional functions that support the IAB. The backhaul can perform multi-hop via a plurality of hops (i.e., a plurality of IAB nodes 300).

Each IAB node 300 includes a DU functional unit and a Mobile Termination (MT) functional unit.

The MT is connected to the DU of an upper node (an upper IAB node 300 or a donor gNB 200-1). The MT is connected to the CU of the donor gNB 200-1 by using RRC and establishes, with the donor gNB 200-1, a signaling radio bearer (SRB) that carries an RRC message and an NAS message. An adjacent node on an NR Uu radio interface of the MT (i.e., an upper node) may be referred to as a "parent node".

The DU manages cells similarly to the gNB 200. The DU terminates the NR Uu radio interface to the UE 100 and a lower IAB node 300. The DU supports the F1 protocol for the CU of the donor gNB 200-1. An adjacent node on an NR access interface of the DU (i.e., lower node) may be referred to as a "child node".

All IAB nodes 300 connected to the donor gNB 200-1 via one or a plurality of hops form an IAB topology rooted in the donor gNB 200-1. Such an IAB topology may also be referred to as a Directed Acyclic Graph (DAG). In the IAB topology, the direction toward the parent node may be referred to as "upstream" or "upper", and the direction toward the child node may be referred to "downstream" or "lower".

Each IAB node 300 in the IAB topology establishes a radio backhaul link with the parent node (IAB node 300 or donor gNB 200-1). The UE 100 establishes a radio access link with the IAB node 300. The communication between the UE 100 and the donor gNB 200-1 is relayed via one radio access link and one or a plurality of radio backhaul links.

A plurality of parent nodes of the IAB node 300 may be provided. In other words, one IAB node 300 may establish a radio backhaul link with each of the plurality of IAB nodes 300 as the parent nodes. For example, the IAB node 300 may have dual connectivity to two parent nodes. One of two parent nodes is a master node (MN), and the other is a secondary node (SN). The radio backhaul link between the IAB node 300 and the MN may be referred to as a Master Cell Group (MCG) link, and the radio backhaul link between the IAB node 300 and the SN may be referred to as a Secondary Cell Group (SCG) link.

FIG. 1 illustrates an example in which an IAB node 300-1 is wirelessly connected to the donor gNB 200-1, an IAB node 300-2 is wirelessly connected to the IAB node 300-1, an IAB node 300-3 is wirelessly connected to the IAB node 300-2, and the F1 protocol is transmitted via three backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor or an apparatus provided in the sensor, and/or a vehicle or an apparatus provided in the vehicle. The UE 100 is wirelessly connected to an upper node (IAB node 300 or gNB 200) via a radio access link. The IAB node 300 including the radio access link with the UE 100, in a case of relaying communication of the UE 100, operates as an access IAB node 300 of the UE 100.

FIG. 1 illustrates an example in which the UE 100 is wirelessly connected to the IAB node 300-3. The UE 100 indirectly communicates with the donor gNB 200-1 via the IAB node 300-3, the IAB node 300-2, and the IAB node 300-1. Specifically, the IAB node 300-3, the IAB node 300-2, and the IAB node 300-1 relay uplink data from the UE 100 to the donor gNB 200-1 and relay downlink data from the gNB 200-1 to the UE 100.

Figure 2:
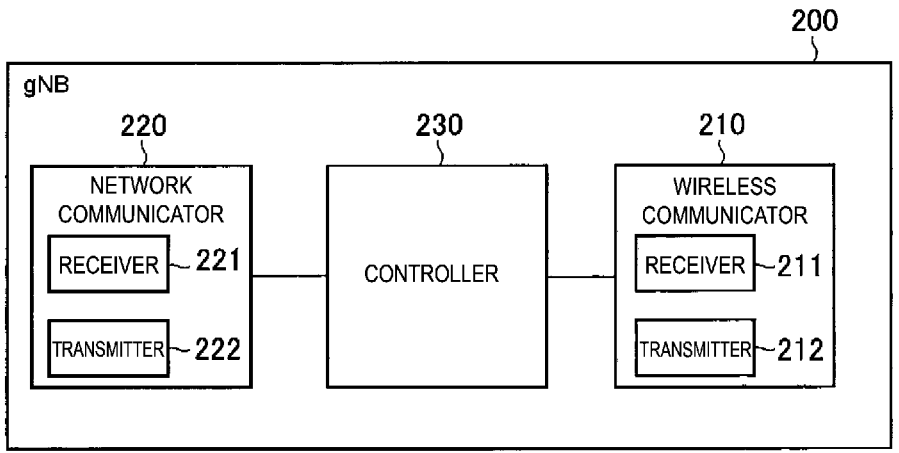
FIG. 2 is a diagram illustrating a configuration of a gNB 200.

Now, a configuration of the gNB 200 that is a base station according to an embodiment will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna and converts a radio signal received by the antenna into a baseband signal (received signal) and outputs the baseband signal to the controller 230. The transmitter 212 performs various types of transmissions under control of the controller 230. The transmitter 212 includes an antenna and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another adjacent gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal to be output by the controller 230 to the outside.

The controller 230 performs various types of control in the gNB 200. The controller 230 includes at least one memory and at least one processor electrically connected to the memory. The memory stores programs to be executed by the processor and information to be used for processing by the processor. The processor may include a baseband processor and a Central Processing Unit (CPU). The baseband processor performs modulation and demodulation, coding and decoding, and the like, of a baseband signal. The CPU executes the programs stored in the memory to perform various types of processing. The processor executes processing of the layers described below.

Figure 3:
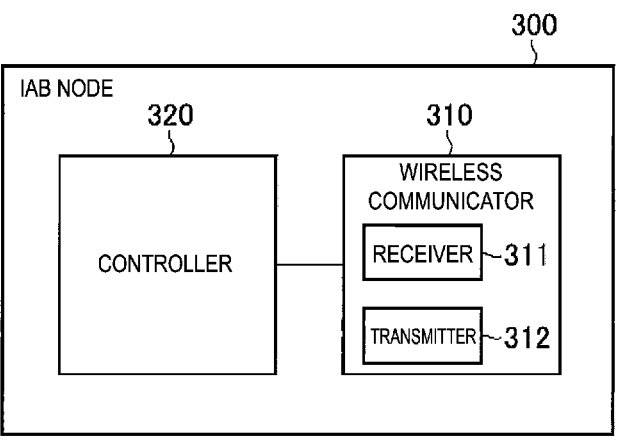
FIG. 3 is a diagram illustrating a configuration of an IAB node 300.

Next, a configuration of the IAB node 300 that is a relay node according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (radio backhaul link) with the gNB 200 or other IAB nodes 300 and performs wireless communication (radio access link) with the UE 100. The wireless communicator 310 for radio backhaul link communication and the wireless communicator 310 for radio access link communication may be provided separately.

The wireless communicator 310 includes a receiver 311 and a transmitter 312. The receiver 311 performs various types of receptions under control of the controller 320. The receiver 311 includes an antenna and converts a radio signal received by the antenna into a baseband signal (received signal) and outputs the baseband signal to the controller 320. The transmitter 312 performs various types of transmissions under control of the controller 320. The transmitter 312 includes an antenna and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processing by the processor. The processor may include a baseband processor and a CPU. The baseband processor performs modulation and demodulation, coding and decoding, and the like, of a baseband signal. The CPU executes the programs stored in the memory to perform various types of processing. The processor executes processing of the layers described below.

Note that, although illustration is omitted in FIG. 3, the IAB node 300 may include a Global Navigation Satellite System (GNSS) receiver. The IAB node 300 may not include the GNSS receiver.

Figure 4:
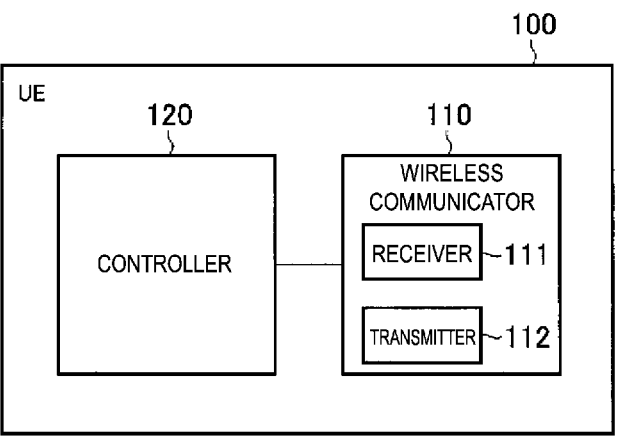
FIG. 4 is a diagram illustrating a configuration of a UE 100.

Now, a configuration of the UE 100 that is a user equipment according to an embodiment will be described. FIG. 4 is a diagram illustrating a configuration of the UE 100. As illustrated in FIG. 4, the UE 100 includes a wireless communicator 110 and a controller 120.

The wireless communicator 110 performs wireless communication in the radio access link, specifically, wireless communication with the gNB 200 and wireless communication with the IAB node 300. The wireless communicator 110 includes a receiver 111 and a transmitter 112. The receiver 111 performs various types of receptions under control of the controller 120. The receiver 111 includes an antenna and converts a radio signal received by the antenna into a baseband signal (received signal) and outputs the baseband signal to the controller 120. The transmitter 112 performs various types of transmissions under control of the controller 120. The transmitter 112 includes an antenna and converts a baseband signal (transmission signal) to be output by the controller 120 into a radio signal and transmits the radio signal from the antenna.

The controller 120 performs various types of controls in the UE 100. The controller 120 includes at least one memory and at least one processor electrically connected to the memory. The memory stores programs to be executed by the processor and information to be used for processing by the processor. The processor may include a baseband processor and a CPU. The baseband processor performs modulation and demodulation, coding and decoding, and the like, of a baseband signal. The CPU executes the programs stored in the memory to perform various types of processing. The processor executes processing of the layers described below.

Note that, although illustration is omitted in FIG. 4, the UE 100 may include a GNSS receiver. The UE 100 may not include a GNSS receiver.

Protocol Stack

Figure 5:
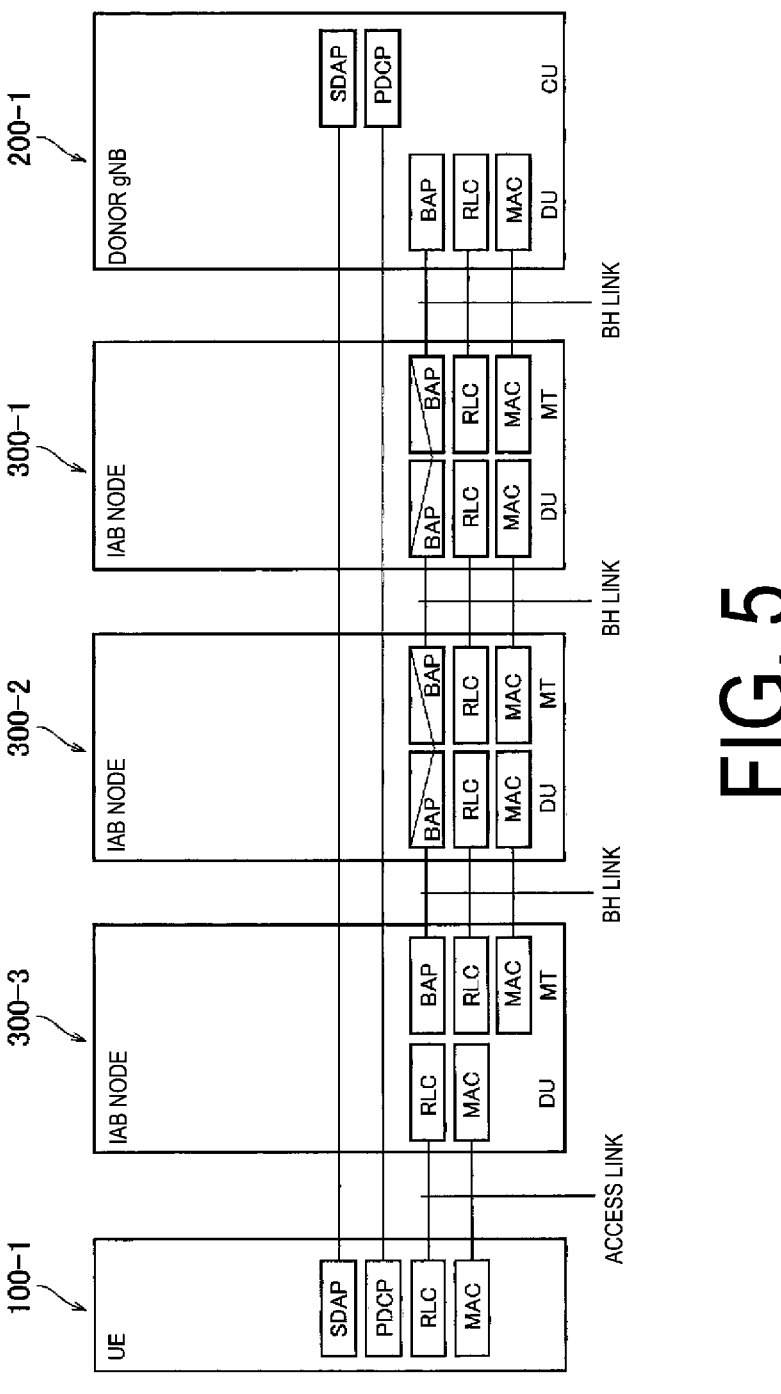
FIG. 5 is a diagram illustrating an example of a protocol stack of a user plane.

Next, an example of a protocol stack configuration in the mobile communication system 1 according to an embodiment will be described. FIG. 5 is a diagram illustrating an example of a protocol stack of a user plane.

As illustrated in FIG. 5, the donor gNB 200-1 includes layers of Service Data Adaptation Protocol (SDAP), Packet Data Convergence Protocol (PDCP), Backhaul Adaptation Protocol (BAP), Radio Link Control (RLC), and Medium Access Control (MAC).

The SDAP and the PDCP are installed in the CU of the donor gNB 200-1, and the BAP, the RLC, and the MAC are installed in the DU of the donor gNB 200-1.

A UE 100-1 includes layers of the SDAP, PDCP, RLC, and MAC.

The PDCP layer of the UE 100-1 and the PDCP layer of the donor gNB 200-1 communicate with each other via the IAB node 300-1 to IAB node 300-3.

Each of the IAB node 300-1 to IAB node 300-3 includes the MT and DU functional units. The MT includes the layers of the BAP, RLC, and MAC. The DU includes the layers of the BAP, RLC, and MAC. FIG. 5 illustrates an example in which the BAP layer of the DU and the BAP layer of the MT are separately provided. However, the BAP layer of the DU and the BAP layer of the MT may be integrated.

PDCP data packets transmitted and received between the PDCP layer of the UE 100-1 and the PDCP layer of the donor gNB 200-1 are relayed via the BAP layers of the IAB node 300-1 to IAB node 300-3.

Although illustration is omitted in FIG. 5, each of the DU of the IAB node 300-3 and the donor gNB 200-1 includes an upper layer of the user plane (hereinafter, a "UP upper layer"). The UP upper layer of the DU of the IAB node 300-3 and the UP upper layer of the donor gNB 200-1 communicate with each other via the IAB node 300-1 to IAB node 300-3. The UP upper layer includes, for example, layers of Internet Protocol (IP), User Datagram Protocol (UDP), and GPRS Tunnelling Protocol for User Plane (GTP-U).

Figure 6:
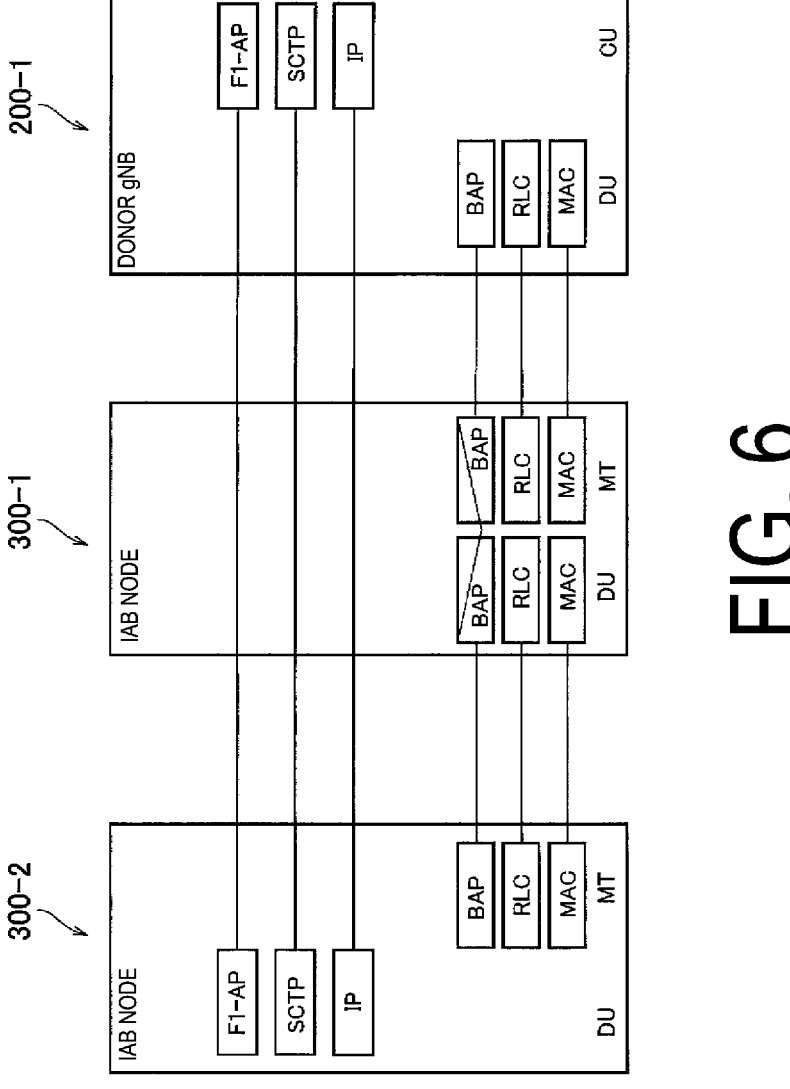
FIG. 6 is a diagram illustrating an example of a protocol stack of a control plane.

FIG. 6 is a diagram illustrating an example of a protocol stack of the control plane. As illustrated in FIG. 6, an F1 application protocol (F1-AP) layer of the CU and an F1-AP layer of the DU of the IAB node 300-2 communicate with each other via the IAB node 300-1. Each of the donor gNB 200-1 and the IAB node 300-2 includes layers of Stream Control Transmission Protocol (SCTP) and the IP. Note that, although illustration is omitted in FIG. 6, the F1-AP layer of the CU and the F1-AP layer of the DU of the IAB node 300-1 communicate with each other. The F1-AP layer of the CU and the F1-AP layer of the DU of the IAB node 300-2 communicate with each other.

Figure 7:
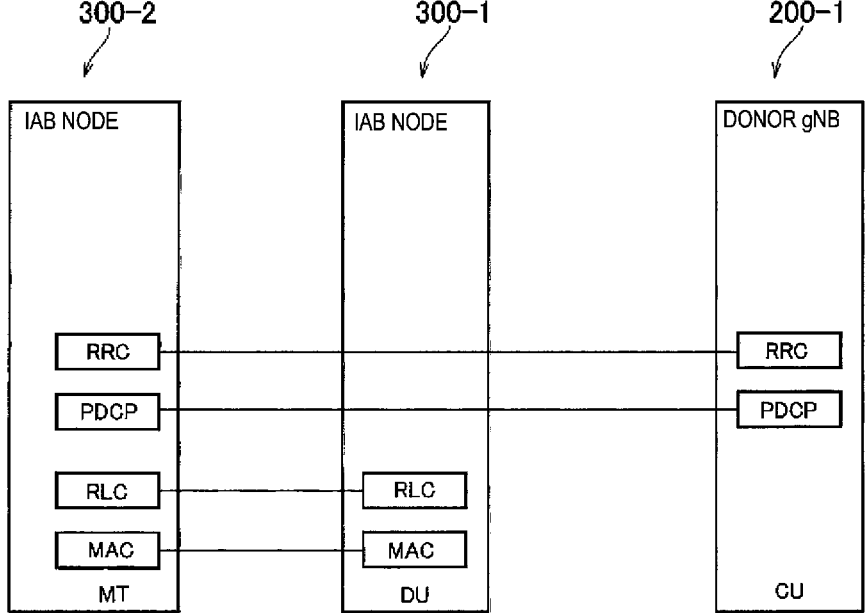
FIG. 7 is a diagram illustrating an example of the protocol stack of the control plane.

FIG. 7 is a diagram illustrating an example of a protocol stack of the control plane. As illustrated in FIG. 7, the RRC layer of the CU and the RRC layer of the MT of the IAB node 300-2 communicate with each other via the IAB node 300-1. Note that, although illustration is omitted in FIG. 7, the RRC layer of the CU and the RRC layer of the MT of the IAB node 300-1 communicate with each other. The RRC layer of the CU and the RRC layer of the MT of the IAB node 300-2 communicate with each other.

Note that, although illustrations are omitted in FIGS. 5 to 7, a PHY layer is installed under the MAC layer of each node.

Now, each protocol will be described. The PHY layer performs coding and decoding, modulation and demodulation, antenna mapping and antenna demapping, and resource mapping and resource demapping. Between the PHY layers, data and control information are transmitted via a physical channel.

The MAC layer performs retransmission processing and the like through priority control of data and a hybrid ARQ (HARQ). Between the MAC layers, data and control information are transmitted via a transport channel. The MAC layer of the donor gNB 200-1 and the MAC layer of the DU include a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception end by using functions of the MAC layer and the PHY layer. Data and control information are transmitted between the RLC layers via a logical channel.

The BAP layer executes, in the user plane, routing processing and bearer mapping and demapping processing. Details of the processing in the BAP layer will be described below.

The PDCP layer performs header compression and decompression, and encryption and decryption.

The SDAP layer maps a QoS flow being a unit in which the core network performs QoS control onto a radio bearer being a unit in which the access stratum (AS) performs QoS control.

The RRC layer transmits RRC signaling for various configurations. The RRC layer controls a logical channel, a transport channel, and a physical channel in response to establishment, reestablishment, and release of a radio bearer. In a case where there is RRC connection between the RRC layers, the IAB node 300 is in an RRC connected state. In a case where there is no RRC connection between the RRC layers, the IAB node 300 is in an RRC idle state.

The SDAP, the PDCP, the BAP, the RLC, and the MAC may be referred to as layer 2.

IAB Topology

Figure 8:
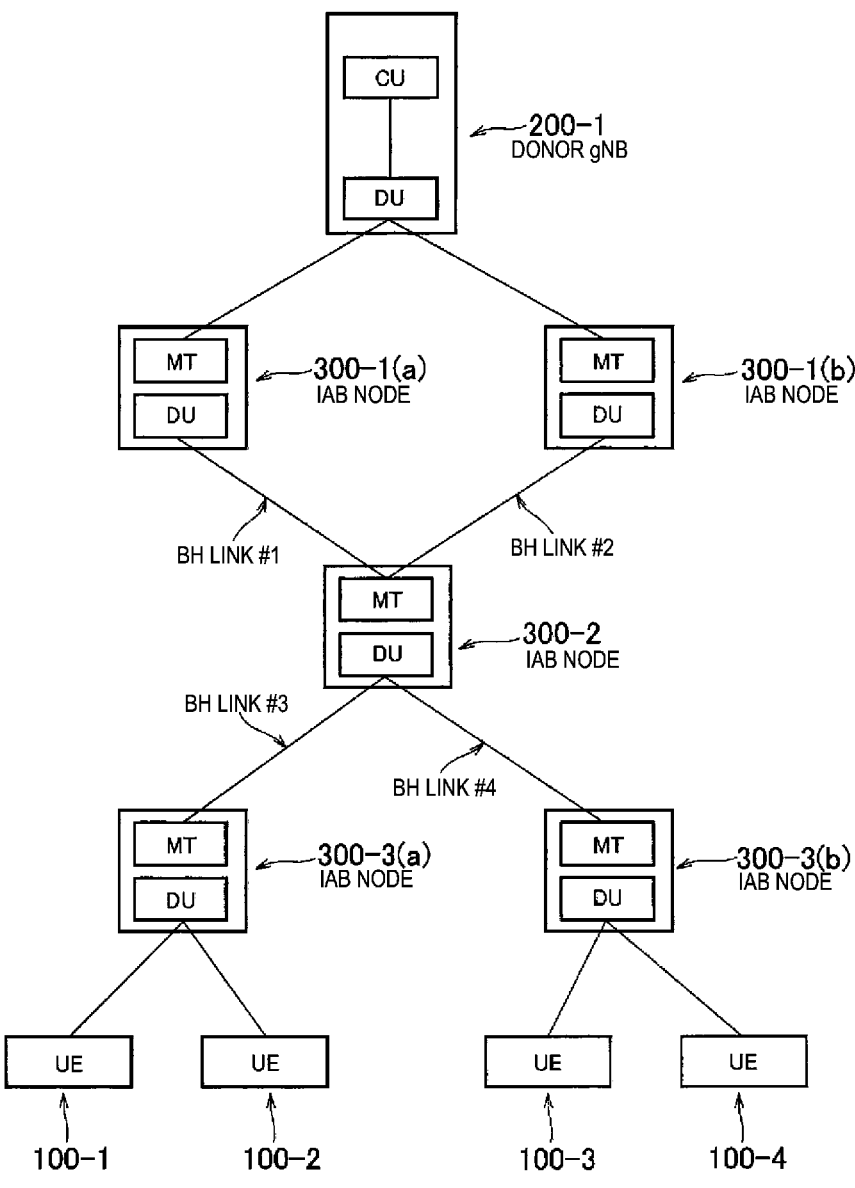
FIG. 8 is a diagram illustrating an IAB topology according to an embodiment.

Next, the IAB topology according to an embodiment will be described. FIG. 8 is a diagram illustrating the IAB topology according to an embodiment. As illustrated in FIG. 8, the IAB topology includes an IAB node 300-1(*a*), an IAB node 300-1(*b*), the IAB node 300-2, an IAB node 300-3(*a*), and an IAB node 300-3(*b*).

The parent nodes of the IAB node 300-2 are the IAB node 300-1(*a*) and the IAB node 300-1(*b*). The child nodes of the IAB node 300-2 are the IAB node 300-3(*a*) and IAB nodes

300-3(*b*). A UE 100-1 and a UE 100-2 are connected to the IAB node 300-3(*a*). A UE 100-3 and a UE 100-4 are connected to the IAB node 300-3(*b*).

Each IAB node 300 in the IAB topology includes a radio backhaul link with an adjacent IAB node 300 or the donor gNB 200-1.

The IAB node 300-2 in the IAB topology includes a plurality of radio backhaul links (BH links #1 to #4). In each of the radio backhaul link #1 and the radio backhaul link #2, the communication between each of the UE 100-1 to UE 100-4, and the donor gNB 200-1 is relayed. In the radio backhaul link #3, the communication between each of the UE 100-1 and the UE 100-2, and the donor gNB 200-1 is relayed. In the radio backhaul link #4, the communication between each of the UE 100-3 and the UE 100-4, and the donor gNB 200-1 is relayed.

A plurality of relay routes are made to pass through each of the radio backhaul link #1 to the radio backhaul link #4. The relay route includes a plurality of radio backhaul links. The relay route is configured between each IAB node 300, and the donor gNB 200-1 in the IAB topology. The relay route is configured by the donor gNB 200-1. The donor gNB 200-1 configures the relay route for each of the upstream and the downstream for each IAB node 300. In the following, a downstream relay route is referred to as a "DL relay route", and an upstream relay route is referred to as a "UL relay route".

In the topology illustrated in FIG. 8, the donor gNB 200-1 may configure four DL relay routes and four UL relay routes described below.

DL relay route #1: donor gNB 200-1→IAB node 300-1(*a*)→IAB node 300-2→IAB node 300-3(*a*)

DL relay route #2: donor gNB 200-1→IAB node 300-1(*a*)→IAB node 300-2→IAB node 300-3(*b*)

DL relay route #3: donor gNB 200-1→IAB node 300-1(*b*)→IAB node 300-2→IAB node 300-3(*a*)

DL relay route #4: donor gNB 200-1→IAB node 300-1(*b*)→IAB node 300-2→IAB node 300-3(*b*)

UL relay route #1: IAB node 300-3(*a*)→IAB node 300-2→IAB node 300-1(*a*)→donor gNB 200-1

UL relay route #2: IAB node 300-3(*a*)→IAB node 300-2→IAB node 300-1(*b*)→donor gNB 200-1

UL relay route #3: IAB node 300-3(*b*)→IAB node 300-2→IAB node 300-1(*a*)→donor gNB 200-1

UL relay route #4: IAB node 300-3(*b*)→IAB node 300-2→IAB node 300-1(*b*)→donor gNB 200-1

The donor gNB 200-1 assigns, to each UL relay route and each DL relay route described above, a route identifier for identifying the relay route. The donor gNB 200-1 assigns, to each IAB node 300 in the IAB topology, an IAB identifier for identifying the IAB node 300 in the IAB topology. The IAB identifier may be a BAP address assigned to the BAP layer.

The donor gNB 200-1 transmits routing configuration information for each relay route described above to each IAB node 300 in the IAB topology. Each IAB node 300 stores the routing configuration information. The routing configuration information includes UL routing configuration information and DL routing configuration information. The UL routing configuration information includes the route identifier of each UL relay route and the IAB identifier of at least one IAB node 300 in each UL relay route. The DL routing configuration information includes the route identifier of each DL relay route and the IAB identifier of at least one IAB node 300 in each DL relay route. The routing configuration information is transmitted by an RRC message or an F1AP message from the donor gNB 200-1. When a new IAB node 300 is added to the IAB topology, the donor gNB 200-1 may transmit default routing information to the new IAB node 300. The default routing information includes a route identifier of one UL relay route and a route identifier of one DL relay route. For example, the IAB node 300 establishes FLAP connection with the donor gNB 200-1 by using the UL relay route identified by the default routing information, and then, receives the routing configuration information through the F1AP message from the donor gNB 200-1.

Each IAB node 300 and the donor gNB 200-1 perform a routing operation to route the communication between the UE 100 and the donor gNB 200-1 based on the routing configuration information. Each IAB node 300 can identify a child node of the IAB node 300 in each DL relay route passing through the IAB node 300 and can identify a parent node of the IAB node 300 in each UL relay route passing through the IAB node 300, based on the routing configuration information.

When the IAB node 300 can perform the routing operation based on the routing configuration information, the IAB node 300 does not use the default routing information.

In the routing operation based on the routing configuration information, the donor gNB 200-1 refers to the routing configuration information when transmitting the data packets to the UE 100 and specifies one DL relay route from a plurality of DL relay routes that can reach the IAB node 300 to which the UE 100 is connected. The donor gNB 200-1 identifies the child node in the specified DL relay route and transmits, to the child node, the data packets and the route identifier of the specified DL relay route together.

In the routing operation based on the routing configuration information, the IAB node 300 refers to the UL routing configuration information when transmitting the data packets of the UE 100 connected to the IAB node 300 to the donor gNB 200-1 and specifies one UL relay route from a plurality of UL relay routes. The IAB node 300 identifies the parent node in the specified UL relay route and transmits, to the parent node, the data packets and the route identifier of the specified UL relay route together.

In the routing operation based on the routing configuration information, the IAB node 300 on the relay route, in a case of receiving the data packets and the route identifier from the parent node or the child node, identifies the child node or parent node in the specified relay route based on the route identifier and the routing configuration information, and transmits the data packets and the route identifier together to the child node or the parent node.

(1) Operation of BAP Layer

Next, with reference to FIGS. 5 and 8, the operations of the BAP layers of the IAB node 300 and the donor gNB 200-1 according to an embodiment will be described.

As illustrated in FIG. 5, in the BAP layer of the IAB node 300, a BAP entity corresponding to the MT (hereinafter, referred to as a "MT BAP entity") and a BAP entity corresponding to the DU (hereinafter, referred to as a "DU BAP entity") are established. The IAB node 300 establishes the MT BAP entity in response to an RRC message from the CU and establishes the DU BAP entity in response to an F1AP message from the CU. Note that the MT BAP entity and the DU BAP entity may be integrated.

In the BAP layer of the donor gNB 200-1, only the DU BAP entity is established.

1.1 Relay Operation

Next, the relay operation in the BAP layer will be described. Such a relay operation includes the routing operation based on the routing configuration information described above.

The description is given assuming that a data packet is transmitted from the donor gNB 200-1 to the UE 100-1 along the DL relay route #1.

First, the DU BAP entity of the donor gNB 200-1 acquires a PDCP data packet addressed to the UE 100-1 and generated in the PDCP layer of the donor gNB 200-1. The BAP entity may acquire the PDCP data packet directly from the PDCP layer or may acquire the PDCP data packet via the UP upper layer. The DU BAP entity specifies the DL relay route #1 among a plurality of DL routes that can reach the IAB node 300-3, for the acquired PDCP data packet. The DU BAP entity adds a BAP header including a route identifier of the DL relay route #1 to the PDCP data packet to generate a BAP data packet. The DU BAP entity transmits the BAP data packet to the IAB node 300-1(*a*) that is the child node in the DL relay route #1, via a radio backhaul link with the IAB node 300-1(*a*). The BAP header of the BAP data packet may include the IAB identifier of the IAB node 300 that is a destination of the BAP data packet.

Second, the MT BAP entity of the IAB node 300-1(*a*) receives the BAP data packet from the donor gNB 200-1 and transmits the BAP data packet to the DU BAP entity. The DU BAP entity acquires the BAP data packet from the MT BAP entity. The DU BAP entity identifies the IAB node 300-2 that is the child node of the IAB node 300-1(*a*) in the DL relay route #1 based on the route identifier included in the BAP header and the DL routing configuration information stored in the IAB node 300-1(*a*). The DU BAP entity transmits the BAP data packet to the IAB node 300-2 via a radio backhaul link with the IAB node 300-2.

Third, the MT BAP entity of the IAB node 300-2 receives the BAP data packet from the IAB node 300-1(*a*) and transmits the BAP data packet to the DU BAP entity. The DU BAP entity acquires the BAP data packet from the MT BAP entity. The DU BAP entity identifies the IAB node 300-3(*a*) that is the child node of the IAB node 300-2 in the DL relay route #1 based on the route identifier included in the BAP header and the DL routing configuration information stored in the IAB node 300-2. The DU BAP entity transmits the BAP data packet to the IAB node 300-3(*a*) via a communication backhaul link with the IAB node 300-3(*a*).

Fourth, the MT BAP entity of the IAB node 300-3(*a*) removes the BAP header of the BAP data packet received from the IAB node 300-2 and can obtain the PDCP data packet. The MT BAP entity passes the PDCP data packet to the RLC entity corresponding to the DU of the IAB node 300-3(*a*). The MT BAP entity may pass the PDCP data packet directly, or via the UP upper layer. The RLC entity transmits the PDCP data packet to the UE 100-1.

Next, the description is given assuming that a data packet is transmitted from the UE 100-1 to the donor gNB 200-1 along the UL relay route #1.

First, the MT BAP entity of the IAB node 300-3(*a*) acquires a PDCP data packet generated in the PDCP layer of the UE 100-1 from the RLC entity of the DU. The MT BAP entity may acquire the PDCP data packet directly, or via the UP upper layer. The MT BAP entity specifies the UL relay route #1 among a plurality of UL routes for the acquired PDCP data packet. The MT BAP entity adds a BAP header including a route identifier of the UL relay route #1 to the PDCP data packet to generate a BAP data packet. The MT BAP entity transmits the BAP data packet to the IAB node 300-2 that is the parent node in the UL relay route #1, via a communication backhaul link with the IAB node 300-2. The BAP header of the BAP data packet may include the IAB identifier of the donor gNB 200-1 that is a destination of the BAP data packet.

Second, the DU BAP entity of the IAB node 300-2 receives the BAP data packet from the IAB node 300-3(*a*) and transmits the BAP data packet to the MT BAP entity. The MT BAP entity acquires the BAP data packet from the DU BAP entity. The MT BAP entity identifies the IAB node 300-1(*a*) that is the parent node of the IAB node 300-2 in the UL relay route #1, based on the route identifier included in the BAP header and the UL routing configuration information stored in the IAB node 300-2. The MT BAP entity transmits the BAP data packet to the IAB node 300-1(*a*) via a communication backhaul link with the IAB node 300-1(*a*).

Third, the DU BAP entity of the IAB node 300-1(*a*) receives the BAP data packet from the IAB node 300-2 and transmits the BAP data packet to the MT BAP entity. The MT BAP entity acquires the BAP data packet from the DU BAP entity. The MT BAP entity transmits the BAP data packet to the donor gNB 200-1 via a communication backhaul link with the donor gNB 200-1.

Fourth, the DU BAP entity of the donor gNB 200-1 acquires the BAP data packet from the IAB node 300-1(*a*) and removes the BAP header of the BAP data packet to obtain the PDCP data packet. The DU BAP entity passes the PDCP data packet to the PDCP entity of the CU. The DU BAP entity may pass the PDCP data packet directly, or via the UP upper layer. The PDCP entity processes the PDCP data packet acquired from the DU BAP entity and passes a resultant data packet to the SDAP entity.

1.2 Rerouting Operation

Next, a rerouting operation performed in the BAP entity of the IAB node 300 performing the relay operation described above will be described.

The BAP entity of the IAB node 300 performs, when transmitting the BAP data packet, the rerouting operation due to occurrence of a routing information error, a radio link failure (RLF) of a radio backhaul link, mobility, or the like. In the rerouting operation, the BAP entity transmits the BAP data packet for which the relay route is specified, via an available relay route different from the specified relay route (e.g., a relay route identified by the BAP header). The available different relay route is a relay route that can reach the destination of the BAP data packet and in which a radio backhaul link between the child node or the parent node of the IAB node 300 and the IAB node 300 is available in the relay route.

The BAP entity of the IAB node 300 determines, when transmitting the BAP data packet, an occurrence of the routing information error in a case where the identifier of the specified relay route does not match any of the route identifiers included in the routing configuration information stored in the IAB node 300. The BAP entity performs rerouting by using the available relay route identified by the default routing information stored in the IAB node 300 in response to the occurrence of the routing information error. In this case, the BAP entity determines that a reason for the rerouting is the routing information error.

The IAB node 300 determines, when transmitting the BAP data packet, whether an RLF occurs in the radio backhaul link established with the child node or the parent node corresponding to the specified relay route. In a case where an RLF is determined to occur, the BAP entity of the IAB node 300 performs rerouting by using the available relay route identified based on the routing configuration information. In this case, the BAP entity determines that the reason for the rerouting is the RLF.

The IAB node 300 may not be able to use, when performing mobility such as handover or RRC reconnection, the specified relay route because the parent node of the connection destination is changed. In response to performing of the mobility, the IAB node 300 may receive new routing configuration information from the donor gNB 200-1.

In the case where the specified relay route is unavailable in response to performing of the mobility by the IAB node 300, the BAP entity of the IAB node 300 performs rerouting by using an available relay route identified by the routing configuration information stored in the IAB node 300 or the new routing configuration information received in response to the mobility. In this case, the BAP entity determines that the reason for the rerouting is the mobility.

The BAP entity of the IAB node 300 may receive, when transmitting the BAP data packet, ACK/NACK information of the BAP data packet from the RLC entity. The BAP entity may perform rerouting in a case of failing to receive the ACK within a predetermined period of time. The predetermined period of time may be preconfigured or may be configured by the donor gNB 200-1. In this case, the BAP entity determines that the reason for the rerouting is a radio situation.

The BAP entity of the IAB node 300 may perform rerouting for other reasons. In this case, the BAP entity determines that the reason for the rerouting is unspecified.

The BAP entity of the IAB node 300 may count and store the number of data packets to be rerouted.

The BAP entity of the IAB node 300 may store, when performing rerouting, the reason for the rerouting (such as routing information error, RLF, mobility, or undefined). The BAP entity may store the route identifier for which the rerouting has been performed.

The rerouting operation described above may be performed by the BAP entity of the donor gNB 200-1.

1.3 Discard Operation

Next, a packet discard operation performed in the BAP entity of the IAB node 300 performing the relay operation described above will be described.

The BAP entity of the IAB node 300 performs, when transmitting the BAP data packet, the packet discard operation due to occurrence of a buffer overflow, mobility, an RLF of a radio backhaul link, or the like.

When transmitting the BAP data packet, the BAP entity of the IAB node 300 first stores the BAP data packet available for transmission in a buffer of the BAP entity, and then extracts and transmits the BAP data packet from the buffer when transmission is prepared (e.g., a radio resource for transmission is prepared). The BAP entity of the IAB node 300 may discard BAP data packets when receiving the BAP data packets exceeding the capacity of the BAP entity buffer. In this case, the BAP entity determines that a reason for the discard is a buffer overflow.

In the case where the IAB node 300 performs the mobility described above, the BAP entity may discard BAP data packets in a case where the specified relay route is unavailable. In this case, the BAP entity determines that the reason for the discard is the mobility.

When the BAP entity of the IAB node 300 performs the rerouting described above, the BAP entity may discard the BAP data packets in a case where the relay route available for rerouting cannot be identified. In this case, the BAP entity determines that the reason for the discard is a rerouting failure.

The BAP entity of the IAB node 300 may discard, when transmitting a BAP data packet, the BAP data packet in a case where an RLF occurs in the radio backhaul link used for the transmission. In this case, the BAP entity of the IAB node 300 determines that the reason for the discard is the RLF.

The BAP entity of the IAB node 300 may discard, when transmitting the BAP data packet, the BAP data packet in a case of failing to receive the ACK within a predetermined period of time. In this case, the BAP entity determines that the reason for the discard is a radio situation.

The BAP entity of the IAB node 300 may store a reason for the discard operation when performing the discard operation.

The BAP entity of the IAB node 300 may count and store the number of data packets to be discarded. The BAP entity may store the route identifier for which the packet discard is performed.

The discard operation described above may be performed by the BAP entity of the donor gNB 200-1.

1.4 Communication Quality Measurement

Next, a communication quality measurement operation performed in the BAP entity of the IAB node 300 or donor gNB 200-1 according to an embodiment will be described.

The BAP entity of the IAB node 300 or donor gNB 200-1 according to an embodiment measures, when performing the relay operation described above, a parameter related to the communication quality of the data packet (hereinafter, referred to as "communication quality parameter"). The BAP entity stores a measurement result related to the measured communication quality parameter.

1.4.1 Communication Quality Parameter

Next, the communication quality parameter measured in the BAP entity of the IAB node 300 or donor gNB 200-1 according to an embodiment will be described.

The communication quality parameter may include transmission delay that occurs when the BAP entity transmits the BAP data packet.

The BAP entity of the IAB node 300 measures the transmission delay by using a method described below. First, the BAP entity stores first time information indicating a first time point being a time point at which the BAP data packet reaches the BAP entity (i.e., a time point at which the BAP data packet is acquired). Second, the BAP entity transmits the BAP data packet to an adjacent IAB node 300 via a radio backhaul link. Third, the MAC entity of the IAB node 300 receives, from the adjacent IAB node 300, information (ACK) indicating that reception of the BAP data packet is successful and notifies the BAP entity of second time information indicating a second time point being a time point at which the ACK is received. Fourth, the BAP entity calculates a difference between the first time information and the second time information (i.e., a period of time from the first time point to the second time point) as the transmission delay.

The communication quality parameter may include average transmission delay for a predetermined number of measured BAP data packets. The predetermined number may be the number of the BAP data packets measured during a measurement period configured by the donor gNB 200-1. The predetermined number may be the number of measurement packets configured by the donor gNB 200-1.

The communication quality parameter may include a ratio of the BAP data packets exceeding a transmission delay threshold to the predetermined number of measured BAP data packets. The transmission delay threshold may be configured from the donor gNB 200-1.

The communication quality parameter may include processing delay that occurs in the BAP entity when the BAP entity transmits a BAP data packet via the radio backhaul link.

The BAP entity of the IAB node 300 measures the processing delay by using a method described below. First, the BAP entity stores the first time information indicating the first time point being a time point at which the BAP data packet reaches the BAP entity (i.e., a time point at which the BAP data packet is received). Second, the BAP entity passes the BAP data packet to the RLC entity and stores third time information indicating a third time point being a time point at which the BAP data packet is passed. Third, the BAP entity calculates a difference between the first time information and the third time information (i.e., a period of time from the first time point to the third time point) as the processing delay.

The communication quality parameter may include average processing delay for a predetermined number of measured BAP data packets.

The communication quality parameter may include a ratio of the BAP data packets exceeding a processing delay threshold to the predetermined number of measured BAP data packets. The processing delay threshold may be configured from the donor gNB 200-1.

The communication quality parameters may include the number of discards, which is the number of data packets discarded by the discard operation described above, in the BAP entity. The BAP entity may count the number of discards for each of the reasons for the discard.

The communication quality parameter may include a discard ratio, which is a ratio of the data packets discarded by the discard operation to a predetermined number of transmitted BAP data packets. The BAP entity may calculate the discard ratio for each of the reasons for the discard.

The communication quality parameter may include the number of rerouting counts, which is the number of data packets rerouted by the rerouting operation described above, in the BAP entity. The BAP entity may count the number of rerouting counts for each of the reasons for the rerouting.

The communication quality parameter may include a rerouting ratio, which is a ratio of the data packets rerouted by the rerouting operation to a predetermined number of transmitted BAP data packets. The BAP entity may calculate the rerouting ratio for each of the reasons for the rerouting.

The communication quality parameter include the number of packet losses, which is the number of BAP data packets in which the adjacent IAB node 300 has failed to receive among a plurality of BAP data packets transmitted to the adjacent IAB node 300 via the radio backhaul link. The BAP data packet in which the adjacent IAB node 300 has failed to receive is the BAP data packet for which the ACK cannot be received from the adjacent IAB node 300 and that are not retransmitted.

The communication quality parameter may include a packet loss ratio, which is a ratio of the BAP data packets in which the adjacent IAB node 300 has failed to receive to a predetermined number of transmitted BAP data packets.

The communication quality parameter may include the number of missing packets, which is the number of PDCP sequence numbers missing among a plurality of PDCP data packets transmitted with the PDCP sequence numbers being consecutive and received from the adjacent IAB node 300. The communication quality parameter may include a ratio of the number of missing packets to the number of the plurality of PDCP data packets.

The BAP entity of the IAB node 300 identifies, by reading the header of the PDCP data packet in the BAP data packet that reaches the BAP entity, the PDCP sequence number of the PDCP data packet corresponding to the BAP data packet. For example, in a case where the PDCP sequence number corresponding to the BAP data packet that initially reaches the BAP entity within a predetermined period of time is "1" and the PDCP sequence number corresponding to the BAP data packet that finally reaches the BAP entity in the predetermined period of time is "10", if the BAP data packets corresponding to the PDCP data packets having the PDCP sequence numbers "3" and "4" are not received within the predetermined period of time, the number of missing packets is two.

1.4.2 Measurement Types

Next, measurement types for measuring the communication quality parameter by the BAP entity of the IAB node 300 or donor gNB 200-1 according to an embodiment will be described.

The measurement types include "per UE 100", "per relay route", "per relay direction", "per QoS level", and the like.

The measurement of communication quality parameter "per UE 100" will be described.

In a case where the IAB node 300 relays the communications of a plurality of UEs 100, the BAP entity of the IAB node 300 may measure the communication quality parameter for each of the plurality of UEs 100 for the data packet belonging to the UE 100. The BAP entity stores the measurement result for each of the plurality of UEs 100.

For example, referring to FIG. 8, the IAB node 300-2 relays communications of four UEs 100, i.e., the UE 100-1 to UE 100-4. The BAP entity of the IAB node 300-2 measures the communication quality parameter for each of the UE 100-1 to UE 100-4.

The measurement of the communication quality parameter "per relay route" will be described.

In a case where a plurality of relay routes pass through the IAB node 300, the BAP entity of the IAB node 300 may measure the communication quality parameter for each of the plurality of relay routes for the data packet relayed via the relay route. The BAP entity stores the measurement result for each of the plurality of relay routes.

For example, referring to FIG. 8, the eight relay routes of the DL relay routes #1 to #4 and the UL relay routes #1 to #4 are made to pass through the IAB node 300-2. The BAP entity of the IAB node 300-2 measures the communication quality parameter for each of eight relay routes.

The measurement of the communication quality parameter "per relay direction" will be described.

In a case where the IAB node 300 performs relay in the upstream direction and the downstream direction, the BAP entity of the IAB node 300 may measure the communication quality parameter for each of the upstream direction and the downstream direction for the data packet relayed in the direction. The BAP entity stores the measurement result for each of the upstream direction and the downstream direction.

The measurement of the communication quality parameter "per QoS level" will be described.

The Quality of Service (QoS) level may include a 5G QoS Identifier (5QI). The 5QI is defined to define a class in the QoS control. The 5QI is assigned to each QoS flow. The QoS level may include a QoS Class Identifier (QCI) in LTE.

The IAB node 300 can analyze the data packet to be transmitted and received to identify the QoS level to which the data packet belongs.

The BAP entity of the IAB node 300 measures the communication quality parameter per QoS level and stores the measurement result.

The BAP entity of the IAB node 300 may measure the communication quality parameter for a plurality of measurement types. For example, the BAP entity measures the communication quality parameter "per UE 100" and "per QoS level".

Operation Example

Figure 9:
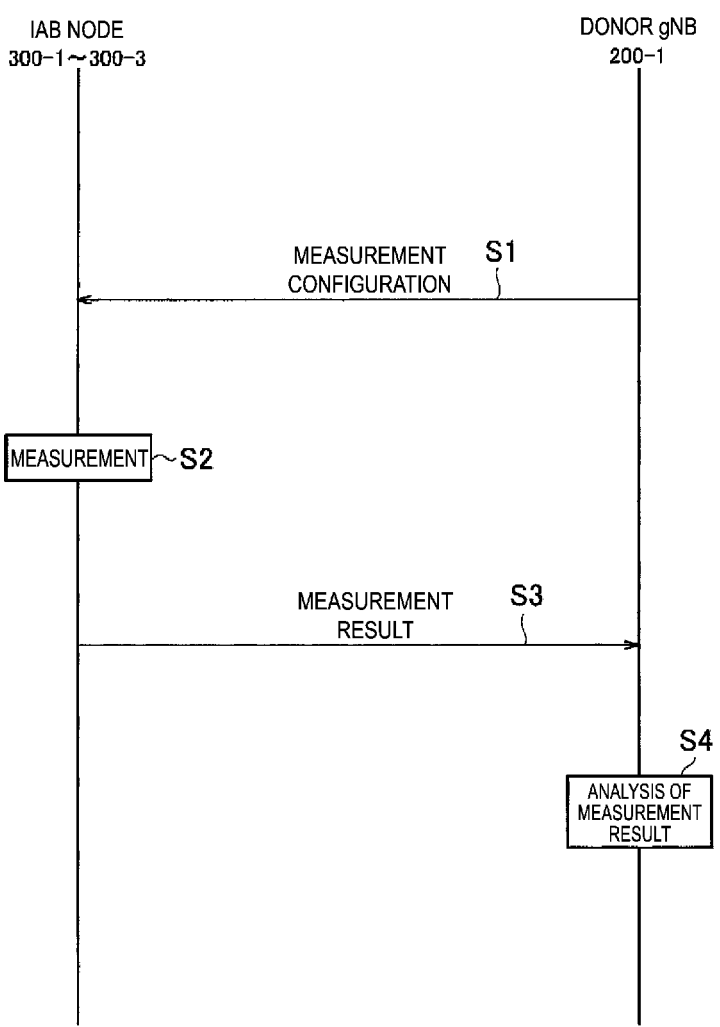
FIG. 9 is a diagram illustrating a sequence of an operation example according to an embodiment.

Next, an operation example according to an embodiment will be described. The operation example according to an embodiment is an operation example related to the measurement and report of the communication quality parameter described above. FIG. 9 is a diagram illustrating a sequence of the operation example according to an embodiment.

As illustrated in FIG. 9, in step S1, the donor gNB 200-1 transmits measurement configuration information related to measurement of a communication quality parameter to each IAB node 300 of the IAB node 300-1 to IAB node 300-3. The measurement configuration information is transmitted by an RRC message or an F1AP message.

The measurement configuration information includes measurement object information indicating the communication quality parameter that is an object to be measured. The object to be measured includes at least one selected from the group consisting of the transmission delay, the processing delay, the number of discards, the number of rerouting counts, the number of packet losses, the number of missing packets, and the like, described above.

The measurement configuration information may include measurement type information indicating the measurement types described above.

The measurement configuration information includes information indicating at least one selected from the group consisting of the measurement period, the number of measurement packets, the transmission delay threshold, and the processing delay threshold, described above. The measurement period may be a period of time defined by measurement start time and measurement end time. The measurement period may be a period of time during which the measurement is to be simply performed without having defined the measurement start time.

The measurement configuration information may include measurement cycle information indicating a measurement cycle.

In step S2, each IAB node 300 of the IAB node 300-1 to IAB node 300-3 performs the communication quality measurement operation, described above, based on the measurement configuration information and stores a measurement result related to the measured communication quality parameter.

In step S3, the IAB node 300 transmits measurement result information indicating the measurement result to the donor gNB 200-1. The measurement result information is transmitted by the RRC message or the F1AP message.

The IAB node 300 may transmit, together with the measurement result information, time information indicating time at which the measurement corresponding to the measurement result is performed, position information indicating a geographical position of the IAB node 300 when the measurement is performed, and the like.

In step S4, the donor gNB 200-1 analyzes the measurement result received from each IAB node 300.

The donor gNB 200-1 analyzes the measurement result, for a certain UE 100, received from each IAB node 300 that relays communication of the UE 100 and thus can obtain communication quality of the communication between the donor gNB 200-1 and the certain UE 100.

The donor gNB 200-1 analyzes the measurement result, for a certain relay route, reported from each IAB node 300 that passes through the certain relay route and thus can obtain the communication quality of the relay route.

The donor gNB 200-1 may optimize the configuration of the IAB topology (e.g., reconfiguration of the relay route) based on the analysis of the measurement result. The donor gNB 200-1 may report the measurement result to Operations, Administration, Maintenance (OAM), and the like. The OAM may optimize the configuration of the network based on the measurement result.

Other Embodiments

Although the communication quality measurement is performed in the BAP layer in the embodiment described above, the communication quality measurement may be performed in other layers (SDAP, PDCP, RLC, MAC) in layer 2. For example, in the PDCP layer of the donor gNB 200-1, instead of the BAP entity, the communication quality parameter of the data packet transmitted and received on the radio backhaul link between the donor gNB 200-1 and the IAB node 300-1 may be measured. In this case, in the embodiment described above, the "BAP data packet" may be interpreted as the "PDCP data packet". The "BAP entity" may be interpreted as the "PDCP entity". In a case where the PDCP entity of the donor gNB 200-1 measures the communication quality parameter including the transmission delay described above, if the donor gNB 200-1 is divided into the DU and the CU, the MAC entity of the DU notifies the PDCP entity of the CU of the second time information.

In a case where the communication quality parameter is measured in the SDAP layer, the "BAP data packet" may be interpreted as the "SDAP data packet" in the embodiment described above. The "BAP entity" may be interpreted as the "SDAP entity". The SDAP entity may measure the communication quality parameter per QoS flow.

The communication quality measurement may be performed by the UE 100.

The IAB node 300 may transmit, to the donor gNB 200-1, capability information indicating communication quality parameter in which the IAB node 300 can measure. The donor gNB 200-1 adjusts the details of the measurement configuration information based on the capability information.

The communication quality parameter may be measured by a communication node as described below. The communication node is a communication node that transmits or receives a data packet to a different communication node or from the different communication node by using a first radio resource belonging to a first cell group and a second radio resource belonging to a second cell group. An example of such a communication node is the IAB node 300-2 in FIG. 8. Another example of such a communication node is a UE 100 performing dual connectivity communication with a master base station (gNB 200) that manages the first cell group and a secondary base station (gNB 200) that manages the second cell group. Such a communication node may be the master base station in the dual connectivity. The master base station communicates with the UE 100 by using a split bearer that uses the first radio resource belonging to the first cell group and the second radio resource belonging to the second cell group.

The communication node measures each of the communication quality parameter of the data packet transmitted or received using the first radio resource and the communication quality parameter of the data packet transmitted or received using the second radio resource.

A program causing a computer to execute each of the processing operations performed by the UE 100, the IAB node 300, or the donor gNB 200-1 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for executing each of the processing operations to be performed by the UE 100, the IAB node 300, or the donor gNB 200-1 may be integrated, and at least part of the UE 100, the IAB node 300, or the donor gNB 200-1 may be configured as a semiconductor integrated circuit (a chipset or an SoC).

Embodiments have been described above in detail with reference to the drawings, but specific configurations are not limited to those described above, and various design modifications and the like can be made without departing from the gist of the embodiments.

The invention claimed is:

1. A method performed by a relay node, the relay node establishing a radio backhaul link, with an adjacent relay node, configured to relay communication between a user equipment and a donor base station, the method comprising:

measuring, by a Backhaul Adaptation Protocol (BAP) entity, a parameter related to communication quality of a data packet, the BAP entity being configured to transmit or receive the data packet via the radio backhaul link; and reporting, by an upper entity, a result of the measuring to the donor base station, the upper entity being located in an upper layer than the BAP entity, wherein the measuring comprises measuring for each of a plurality of Quality of Service (QoS) flows established between the user equipment and a core network, the parameter for a data packet belonging to the each of the QoS flows, and the reporting comprises transmitting by the upper layer to the donor base station, a measurement report including a plurality of QoS identifiers that each identifies one of the plurality of QoS flows and a measurement result of the parameter of the corresponding QoS flow.

2. The method according to claim 1, further comprising relaying, by the relay node, communication between at least one of a plurality of user equipments and the donor base station, wherein the measuring comprises measuring, for each of the plurality of user equipments, the parameter for a data packet belonging to the each of the user equipments, and the reporting comprises reporting a result of the measuring for each of the plurality of user equipments to the donor base station.

3. The method according to claim 1, further comprising receiving, by the relay node and from the donor base station, routing configuration information configured to configure a plurality of relay routes, wherein the plurality of relay routes pass through the relay node and are configured between a different relay node and the donor base station, the different relay node comprising a radio access link with the user equipment, the measuring comprises measuring, for each of the plurality of relay routes, the parameter for a data packet relayed through the each of the relay route, and the reporting comprises reporting a result of the measuring for each of the plurality of relay routes to the donor base station.

4. The method according to claim 1, wherein the parameter comprises transmission delay that occurs in transmitting a data packet to the adjacent relay node via the radio backhaul link, the transmission delay is a period of time from a first time point when the data packet reaches the BAP entity to a second time point, and the second time point is a time point when a Medium Access Control (MAC) entity of the relay node receives, from the adjacent relay node, information indicating that reception of the data packet is successful.

5. The method according to claim 1, wherein the parameter comprises processing delay that occurs, at the BAP entity, in transmitting a data packet to the adjacent relay node via the radio backhaul link, and the processing delay is a period of time from a time point when the data packet reaches the BAP entity to a time point when a Radio Link Control (RLC) entity of the relay node receives the data packet.

6. The method according to claim 1, wherein the parameter comprises a parameter related to the number of discards that is the number of data packets discarded, at the BAP entity, in transmitting a plurality of data packets to the adjacent relay node via the radio backhaul link.

7. The method according to claim 6, further comprising measuring, by the BAP entity, the number of discards per reason for discarding the data packet, wherein the reporting comprises reporting a parameter related to the number of discards measured per the reason to the donor base station.

8. The method according to claim 1, wherein the parameter comprises a parameter related to the number of data packets where the adjacent relay node fails to receive among a plurality of data packets transmitted to the adjacent relay node via the radio backhaul link.

9. The method according to claim 1, further comprising:

establishing, by the relay node, the radio backhaul link with at least one of a plurality of adjacent relay nodes;

receiving, by the relay node and from the donor base station, routing configuration information configured to configure a relay route passing through each of the plurality of adjacent relay nodes; and performing, by the BAP entity, rerouting, the rerouting allowing a data packet where a relay route is specified to be transmitted via a radio backhaul link corresponding to a relay route different from the specified relay route, wherein the parameter comprises a parameter related to the number of rerouting counts that is the number of data packets where the rerouting is performed at the BAP entity.

10. The method according to claim 9, further comprising measuring, by the BAP entity, the number of rerouting counts per reason for the rerouting, wherein the reporting comprises reporting a parameter related to the number of rerouting counts measured per the reason to the donor base station.

11. The method according to claim 8, further comprising:

receiving, by the relay node, a plurality of Packet Data Convergence Protocol (PDCP) data packets transmitted from the adjacent relay node with PDCP sequence numbers being consecutive, wherein the parameter comprises a parameter related to the number of missing PDCP sequence numbers among the plurality of data packets.

12. The method according to claim 1, further comprising receiving, by the relay node and from the donor base station, configuration information configured to configure measurement of the parameter, wherein the measuring comprises a step of measuring the parameter based on the configuration information.

13. A relay node configured to establish a radio backhaul link, with an adjacent relay node, configured to relay communication between a user equipment and a donor base station, the relay node comprising:

a Backhaul Adaptation Protocol (BAP) entity configured to transmit or receive a data packet via the radio backhaul link; and an upper entity located in an upper layer than the BAP entity, wherein the BAP entity performs measurement of a parameter related to communication quality of the data packet, and the upper entity reports a result of the measurement to the donor base station, wherein the measurement comprises a measurement for each of a plurality of Quality of Service (QoS) flows established between the user equipment and a core network, the parameter for a data packet belonging to the each of the QoS flows, and the upper entity reports the result by transmitting by the upper layer to the donor base station, a measurement report including a plurality of QoS identifiers that each identifies one of the plurality of QoS flows and a measurement result of the parameter of the corresponding QoS flow.

\* \* \* \* \*